US011693627B2

(12) United States Patent
Simonyan et al.

(10) Patent No.: US 11,693,627 B2
(45) Date of Patent: Jul. 4, 2023

(54) CONTIGUOUS SPARSITY PATTERN NEURAL NETWORKS

(71) Applicant: DeepMind Technologies Limited, London (GB)

(72) Inventors: Karen Simonyan, London (GB); Nal Emmerich Kalchbrenner, London (GB); Erich Konrad Elsen, San Francisco, CA (US)

(73) Assignee: DeepMind Technologies Limited, London (GB)

( * ) Notice: Subject to any disclaimer, the term of this patent is extended or adjusted under 35 U.S.C. 154(b) by 295 days.

(21) Appl. No.: 16/955,420

(22) PCT Filed: Feb. 11, 2019

(86) PCT No.: PCT/US2019/017495
§ 371 (c)(1),
(2) Date: Jun. 18, 2020

(87) PCT Pub. No.: WO2019/157442
PCT Pub. Date: Aug. 15, 2019

(65) Prior Publication Data
US 2021/0012197 A1      Jan. 14, 2021

Related U.S. Application Data

(60) Provisional application No. 62/628,882, filed on Feb. 9, 2018.

(51) Int. Cl.
*G06F 7/00* (2006.01)
*G06F 7/523* (2006.01)
*G06N 3/08* (2023.01)

(52) U.S. Cl.
CPC ............... *G06F 7/523* (2013.01); *G06N 3/08* (2013.01)

(58) Field of Classification Search
CPC ............ G06N 20/00; G06N 3/08; G06N 3/04; G06N 3/063; G06N 7/005; G06N 3/082; G06F 7/523; G06F 17/16
(Continued)

(56) References Cited

U.S. PATENT DOCUMENTS 9,818,059 B1 * 11/2017 Woo .................. G06N 3/063
10,891,538 B2 * 1/2021 Dally ................ G06N 3/063
(Continued)

OTHER PUBLICATIONS

Palangi et al.; "Using Deep Stacking Network to Improve Structured Compressed Sensing With Multiple Measurement Vectors"; 2013 IEEE International Conference on Acoustics, Speech and Signal Processing; Conference Paper | Publisher: IEEE; Papers (8) (Year: 2013).*
(Continued)

*Primary Examiner* — Brian Ngo
(74) *Attorney, Agent, or Firm* — Fish & Richardson P.C.

(57) ABSTRACT

Methods, systems, and apparatus, including computer programs encoded on computer storage media, for using neural networks having contiguous sparsity patterns. One of the methods includes storing a first parameter matrix of a neural network having a contiguous sparsity pattern in storage associated with a computing device. The computing device performs an inference pass of the neural network to generate an output vector, including reading, from the storage associated with the computing device, one or more activation values from the input vector, reading, from the storage associated with the computing device, a block of non-zero parameter values, and multiplying each of the one or more activation values by one or more of the block of non-zero parameter values.

18 Claims, 4 Drawing Sheets

(58) Field of Classification Search
USPC .......................................... 706/6, 12, 15, 21
See application file for complete search history.

(56) References Cited

U.S. PATENT DOCUMENTS

| | | | |
|---|---|---|---|
| 2018/0046900 A1* | 2/2018 | Dally | G06F 9/30018 |
| 2018/0046916 A1* | 2/2018 | Dally | G06N 3/063 |
| 2019/0108436 A1* | 4/2019 | David | G06N 3/084 |
| 2021/0182676 A1* | 6/2021 | Zlateski | G06N 3/063 |

OTHER PUBLICATIONS

Boo et al.; "Structured Sparse Ternary Weight Coding of Deep Neural Networks for Efficient Hardware Implementations"; 2017 IEEE International Workshop on Signal Processing Systems (SiPS); Conference Paper | Publisher: IEEE; Papers (10) (Year: 2017).*

Mao et al., "Exploring the Regularity of Sparse Structure in Convolutional Neural Networks," CoRR, Jun. 2017, https://arxiv.org/pdf/1705.08922, 10 pages.

Narang et al., "Block-Sparse Recurrent Neural Networks," CoRR, Nov. 2017, https://arxiv.org/abs/1711.02782, 12 pages.

Parashar et al., "SCNN: An Accelerator for Compressed-sparse Convolutional Neural Networks." Proceedings of the 44th Annual International Symposium on Computer Architecture. Jun. 24, 2017, pp. 27-40.

PCT International Preliminary Report on Patentability in International Appln. No. PCT/US2019/017495, dated Aug. 20, 2020, 12 pages.

PCT International Search Report and Written Opinion in International Appln. No. PCT/US2019/017495, dated May 17, 2019, 18 pages.

Van Den Oord et al., "WaveNet: A Generative Model for Raw Audio," CoRR, Sep. 2016, https://arxiv.org/abs/1609.03499, 15 pages.

Wen et al., "Learning Intrinsic Sparse Structures within Long Short-Term Memory." CoRR, Sep. 2017. https://arxiv.org/abs/1709.05027, 14 pages.

Office Action in European Appln. No. 19707563.3, dated Apr. 12, 2023, 11 pages.

Wikipedia.com [online], "Delta encoding," Jan. 7, 2014, retrieved on Jun. 15, 2021, retrieved from URL<http.//www.assaabloy.com/en/com/Press-News/News/2011/NFC-enabled-mobile-access-in-aphysical-access-control-world/>, 5 pages.

* cited by examiner

CONTIGUOUS SPARSITY PATTERN NEURAL NETWORKS

CROSS-REFERENCE TO RELATED APPLICATION

This application is a National Stage Application under 35 U.S.C. § 371 and claims the benefit of International Application No. PCT/US2019/017495, filed on Feb. 11, 2019, which claims priority to U.S. Provisional Application Ser. No. 62/628,882, filed on Feb. 9, 2018. The disclosure of the prior application is considered part of and is incorporated by reference in the disclosure of this application.

BACKGROUND

This specification relates to techniques for implementing neural networks on processing hardware.

Neural networks are machine learning models that employ one or more layers of nonlinear computation units to predict an output for a received input. Some neural networks include one or more hidden layers in addition to an output layer. During an inference pass (i.e. the process performed by the neural network as a whole to generate a set of output(s) based on a corresponding set of inputs to the neural network at a certain timestep), the output of each hidden layer is used as input to the next layer in the network, i.e., the next hidden layer or the output layer.

Each layer of the network generates an output for the next layer in accordance with current values of a respective set of parameters for the layer and one or more transformation operations. The transformation operations of each layer can be performed by processing devices executing installed software kernels that implement the transformation operations of the layer. Thus, a layer being described as performing operations means that the processing devices implementing the transformation operations of the layer perform the transformation operations.

Naturally, as the size and complexity of neural networks increase, the time required to perform an inference pass through the network also increases. In general, the inference speed of a neural network is proportional to the number of parameters in the model. This can impose a significant processing bottleneck that can restrict the types of neural networks that can be implemented on certain types of processing hardware.

This is particularly a challenge for neural networks that have significant throughput requirements, significant latency requirements, or both. For example, real-time audio generation neural networks present significant computational challenges because of the basic high-throughput nature of generating raw audio waveforms. Realistic audio waveform generation typically requires on the order of multiple thousands of samples to be generated per second, e.g., 24,000 samples per second, which, for example, can require 24,000 inference passes to be performed per second. These performance requirements can make it difficult to implement high-throughput neural networks directly on consumer hardware, e.g., mobile phones and tablet computers, that lack the kind of high-performance or parallel processing hardware that might be available in a datacenter. As another example, neural networks that are executed for sensing or control of autonomous and semi-autonomous vehicles have significant latency requirements. In other words, neural networks used to perform sensing and control in real-world driving conditions have to be fast enough that the vehicle can reliably react within certain well-defined time periods, e.g., within microseconds or milliseconds.

One approach to improving the inference speed is to generate layers having sparse connections. In this context, a model having sparse connections between layers means that a substantial number of possible connections are deactivated by having values of zero. For example, between two layers having 1000 neurons each, there are 1000×1000 possible connections, or 1 million possible connections. Instead of having 1 million connections, the connections can be pruned to a small fraction of the possible connections, e.g., only 10,000 or 50,000 connections.

The inference speed can be further improved by training the model to have square block sparsity in the connections. Square block sparsity imposes some structure on the sparsity pattern of the connections by computing, for square regions of parameter matrices, a single representative value, e.g., an average or the maximum value. Square block sparsity does impose some structure in the model parameters, but the pattern of the square blocks within the matrix has essentially uniform randomness.

SUMMARY

This specification describes techniques for improving the inference speed of a neural network, and reducing the data storage requirement of the neural network, by arranging the parameter values into contiguous sparsity patterns. Training a model to have contiguous sparsity involves imposing a structured sparsity pattern in which substantial numbers of non-zero values are likely to be contiguous along the same dimension in a parameter matrix. This also means that substantial numbers of zero values are likely to be contiguous along the same dimension in the parameter matrix.

Experimentally, it is found that a neural network with contiguous sparsity performs broadly equivalently to a neural network with unstructured sparsity (i.e. the same sparsity, but with the non-zero values being distributed randomly), but, crucially, the sparsity pattern can be stored with reduced the data storage capacity. For example, if the parameter values are in 1×m blocks (where m is an integer greater than one), the data required to store the position of the non-zero values is reduced by a factor of m compared to unstructured sparsity.

Furthermore, as explained below, contiguous sparsity permits the neural network to be implemented with more efficient coding than unstructured sparsity, reducing the number of computational operations which are required to implement it.

Both of these advantages are critical in the case that the neural network, although possibly created on a server, is utilized by a client device, such as a mobile phone, with low memory capacity and limited computational power. Note that currently the amounts of computational power and memory bandwidth are respectively three and two orders of magnitude smaller on a mobile CPU (central processing unit) than on a (graphics processing unit) GPU.

What is considered a sufficiently substantial number of contiguous zero or non-zero parameters values is dependent on the underlying training set and design goals of the model. For example, the system can train the model according to hyperparameters that specify one or more of these constraints, e.g., a likelihood of having blocks of contiguous non-zero parameters of at least length 1 with at least frequency f within the parameter matrix.

For simplicity of presentation, this specification will use the term "sparse" to refer to a (two-dimensional) pattern of values (that is, a matrix) in which the number of zero values is greater than the number of non-zero values. Specifically, the proportion of zero values may be at least 80%, at least 90%, or at least 95% (such as at least 96.4% or at least 97.8%), or even at least 99%. The term "sparsity pattern" refers to the dataset indicating where the non-zero values of the parameter matrix are.

The term "block" is used to refer to a (non-square) rectangle of non-zero values within a pattern. Often, a block cannot be extended in either dimension without including at least one zero value of the sparsity pattern; thus, it is may be the largest contiguous block of non-zero values which can be formed. However, it is also possible for two or more such blocks to be adjacent.

We will use the term "contiguous sparsity" to refer to any sparsity pattern substantially composed of a plurality of zero values and blocks of non-zero values have block sizes in which one dimension is substantially larger (e.g. at least 4 times larger (e.g. exactly 4 times larger), or even at least 16 times larger (e.g. exactly 16 times larger)) than the other, and the number of zero values being greater than the number of non-zero values. For example, each of the blocks may be of the same size; that is, they are n×m blocks of non-zero values (where n and m are integers), n being different from m.

A parameter matrix having a contiguous sparsity pattern can have columnar sparsity in which non-zero parameter values are contiguous along columns of the parameter matrix (e.g. in the case of equally-sized blocks, n is greater than m), or can have row sparsity in which non-zero parameter values are contiguous along rows of the parameter matrix (e.g. in the case of equally-sized blocks, m is greater than n). Note that in the case of row sparsity, there may be more than one block in each row of the parameter matrix (e.g. with the multiple blocks being spaced apart by zero values); similarly, in the case of column sparsity, there may be more than one block in each column of the parameter matrix (e.g. with the multiple blocks being spaced apart by zero values). In some parameter matrices, two or more blocks may be adjacent. Also, in the case of row sparsity, a plurality of columns may each contain multiple non-zero values; and in the case of column sparsity, a plurality of rows may each contain multiple non-zero values.

Here, it is to be understood that the horizontal (row) direction in the parameter matrix (i.e. the direction in which the blocks have an extent m) represents the different inputs of the layer, whereas the vertical (column) direction in the parameter matrix (i.e. the direction in which the blocks have an extent n) corresponds to the different outputs of the layer (or different neurons of the layer). For example, in one case, the layer performs multiplication between the parameter matrix and a vector x representing the inputs to the layer (in other words the parameter matrix R of network parameters is multiplied by a vector x representing the input values, in an operation such as R.x), and then performs a function on each of the results of the multiplication. In the case of row sparsity, the process of generating a given output value may comprise a multiplication process for each block of the corresponding row (in which respective input values are multiplied by the parameter values of the block, and then the result summed), a summation of the results over the multiple blocks of the row, and performance of a non-linear function of result of the summation. The multiplication process for each block of non-zero parameter values may be performed after reading that block of non-zero parameter values from storage, and completed before reading any further parameter values from the memory.

A contiguous sparsity pattern can, for example, have blocks in which one of the dimensions is one, e.g., having dimensions 1×m or n×1. However, any n×m block size can be used such that n is substantially larger than (e.g. four or sixteen times as big as) m or vice versa.

Particular embodiments of the subject matter described in this specification can be implemented so as to realize one or more of the following advantages. Using contiguous sparsity patterns allows neural networks with very significant throughput requirements, very significant latency requirements, or both, to be implemented on less powerful processing hardware, e.g., consumer hardware such as mobile phones (or other mobile devices) and tablet computers, having only CPUs and on-board processing devices that are used for controlling autonomous vehicle functions. In these computing environments, the neural network can be implemented locally on the hardware, which means that the network can execute without a network connection to a datacenter, without the use of dedicated parallel processing hardware like GPUs, and without requiring special-purpose hardware. This, for example, allows real-time audio waveform generation to be performed on handheld mobile devices, e.g., for text-to-speech applications. And it allows for more sophisticated and more complex neural networks to be implemented in environments with significant latency requirements. Another application of the neural network would be automatic generation of images. Another application of the neural network would be to generate text or any other appropriate one-dimensional data stream. A further application of the neural network would be to control an agent (e.g. a mechanical device) in an environment, such as a real-world environment, based on input to the network encoding information received by a sensor and characterizing the environment. In one application, the agent may be a transportation device, such as an autonomous or semi-autonomous vehicle.

If the input to the neural network is text, then the input to the neural network at successive times may comprise successive characters of a passage of text.

Alternatively, in other applications, the input to the neural network at successive times may comprise data characterizing an environment (e.g. audio data) obtained by sensors at corresponding successive times.

In one example, the neural network may be a recurrent neural network (RNN) in which a plurality of neurons each generate, in each time-step (e.g. during each inference pass), an output which depends upon a state of the neurons at a previous time-step (which is in turn dependent on the input(s) to the neuron in preceding inference passes). For example, a layer of the neural network may receive among its inputs at a given time-step the output of the neural layer at at least one preceding time-step, e.g. including the immediately preceding time-step.

DETAILED DESCRIPTION

Figure 1:
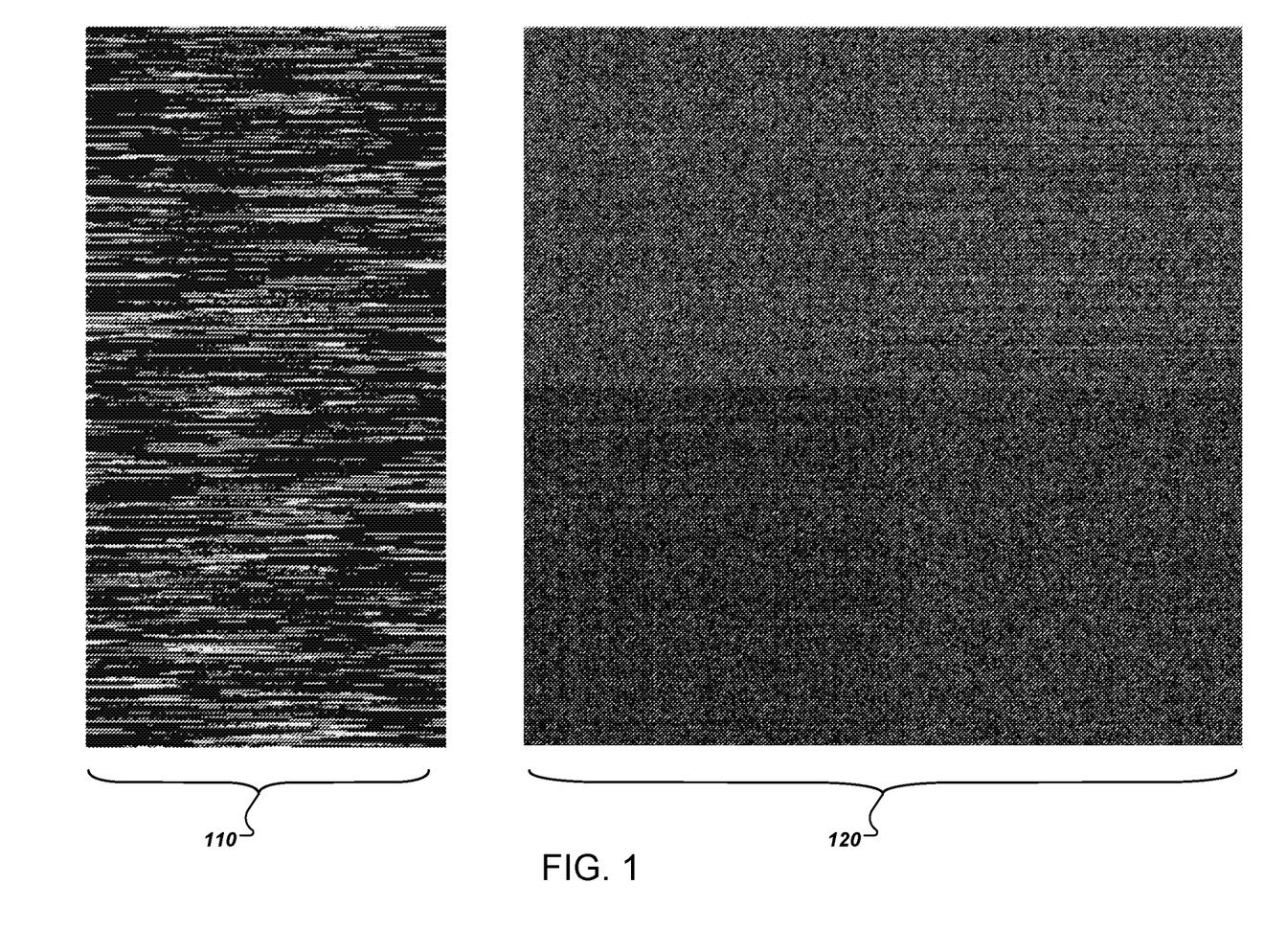
FIG. 1 includes visualizations of parameter matrices that illustrate the structure of a contiguous sparsity pattern compared to a random sparsity pattern

FIG. 1 includes visualizations of parameter matrices that illustrate the structure of a contiguous sparsity pattern compared to a random sparsity pattern. In FIG. 1, black regions represent zero parameter values, and white regions represent non-zero parameter values.

The random sparsity parameter matrix 120 has a random sparsity pattern. Therefore, the non-zero parameter values are distributed substantially uniformly throughout the matrix.

The contiguous sparsity parameter matrix 110 has a contiguous sparsity pattern. Therefore, substantial numbers of non-zero values are contiguous along rows of the parameter matrix.

Contiguous sparsity can be obtained during training by periodically sorting blocks of the parameters according to magnitude, and zeroing out all the parameters of blocks for which the parameters meet a criterion inactive of the parameters being small. For example, the sum of the magnitudes of the parameters of the block may be below a particular threshold. The result is a sparsity pattern that has more structure than a random sparsity pattern and which increases the inference speed relative to a square block sparsity pattern.

Contiguous sparsity can be used to improve the inference speed of a neural network in a number of ways.

Figure 2:
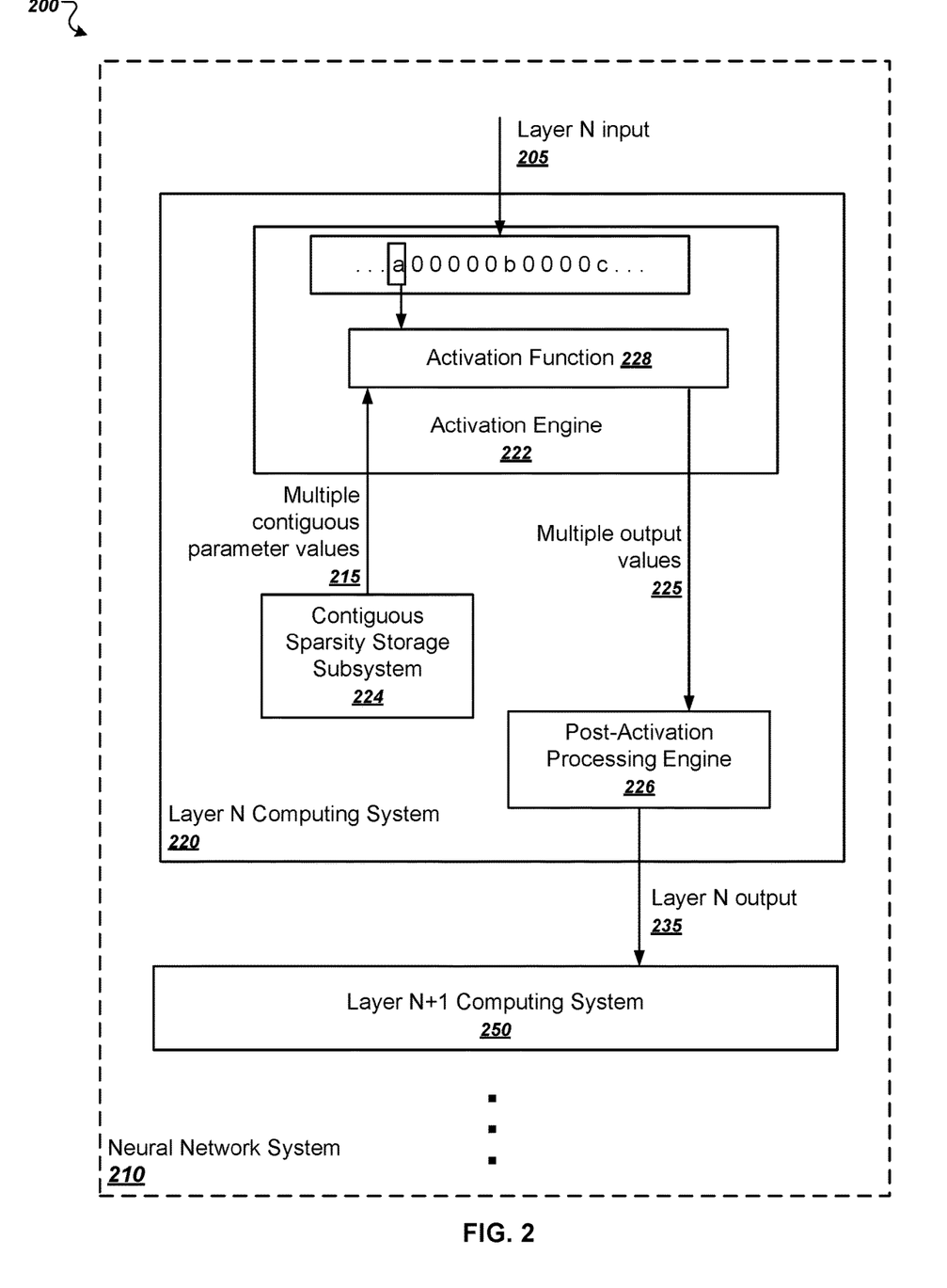
FIG. 2 is a diagram of an example system 200 that uses a contiguous sparsity pattern.

FIG. 2 is a diagram of an example system 200 that uses a contiguous sparsity pattern. The system 200 is an example of a system that can implement the techniques described in this specification. The system 200 can, in one application, implement a signal generation neural network, e.g., a neural network that generates audio, images, text or any other appropriate one-dimensional data stream, on parallel processing hardware. In doing so, some matrix operations can be performed in parallel by all available processing units, and other matrix operations can be performed in parallel by subsets of available processing units.

The system 200 includes a neural network system 210 that is defined by a plurality of layers. In general, each layer has a respective parameter matrix. Thus, layer N has a separate parameter matrix from layer N+1. Each layer is implemented by a respective computing system. For simplicity, only two such layers are illustrated as being implemented by two respective computing systems, a layer N computing system 220, and a layer N+1 computing system 250. Each of these computing systems can be implemented using any appropriate combination of general or special-purpose computing hardware. For example, each computing system can implemented using CPUs, GPUs, or application-specific integrated circuitry, e.g., a machine-learning accelerator. The computing systems 220 and 250 can be implemented by separate computing hardware or the same computing hardware.

The layer N computing system 220 includes an activation engine 222 that is configured to receive an input 205, e.g., an input vector. The components of the input vector are referred to in this document as "activation values". In the case that layer N is the first layer of the network, the activation values are the inputs to the neural network. The input vector may, in one application, be composed of elements have a pre-defined order (for example, they may be indicative of respective text characters in a passage of text; or data describing an environment at successive times). In the case that the layer N is a hidden layer of the neural network, the activation values are outputs from the preceding (i.e. N−1) layer. The activation engine 222 is configured to use the input 205 and the parameter matrix for layer N to generate multiple output values 225 using an activation function 228.

The layer N computing system 220 includes a contiguous sparsity storage subsystem 224. The contiguous sparsity storage subsystem 224 is a subsystem that is configured obtain the parameter matrix for layer N. The parameter matrix is composed on parameter values that are stored in contiguous sparsity patterns, as described below. In one case, the sparsity pattern is such that is it composed entirely of (i) zero values and (ii) blocks of non-zero values which extend vertically. In other words, in this case the contiguous sparsity storage subsystem 224 can obtain multiple contiguous non-zero values for a single input value. In some implementations, the contiguous sparsity storage subsystem 224 implements an application programming interface (API) that takes as an argument a number of contiguous parameter values to read next from the parameter matrix for layer N.

The contiguous sparsity storage subsystem 224 can be a separate storage subsystem for one or more layers, or the contiguous sparsity storage subsystem 224 can be a global storage subsystem for the entire neural network system 210. In some implementations, the contiguous sparsity storage subsystem 224 is implemented by fast memory, e.g., SRAM, that is local to the processing components that perform the operations of the activation function 228. In other words, the parameter matrix for the layer N can be stored in whole or in part in memory that is local to the activation engine 222.

The layer N computing system 220 also includes a post-activation engine 226 that is configured to receive output values 225 generated by the activation engine 222 and to generate a layer N output 235 that is provided to the next layer 250 of the neural network system 210. The post-activation engine 226 can perform aggregation operations on the outputs 225 generated by the activation function 228, including summation, pooling, and soft-max operations.

To use the contiguously stored parameter values, the activation engine 222 can read each non-zero value from the input 205 and then read multiple contiguously stored parameter values from the contiguous sparsity storage subsystem 224. The activation engine 222 can then generate multiple output values 225 for the single input value, e.g., by multiplying the input value by each of the contiguously stored parameter values and providing the individual products, or a partial summation of the products, to the post-activation processing engine 226.

Figure 3:
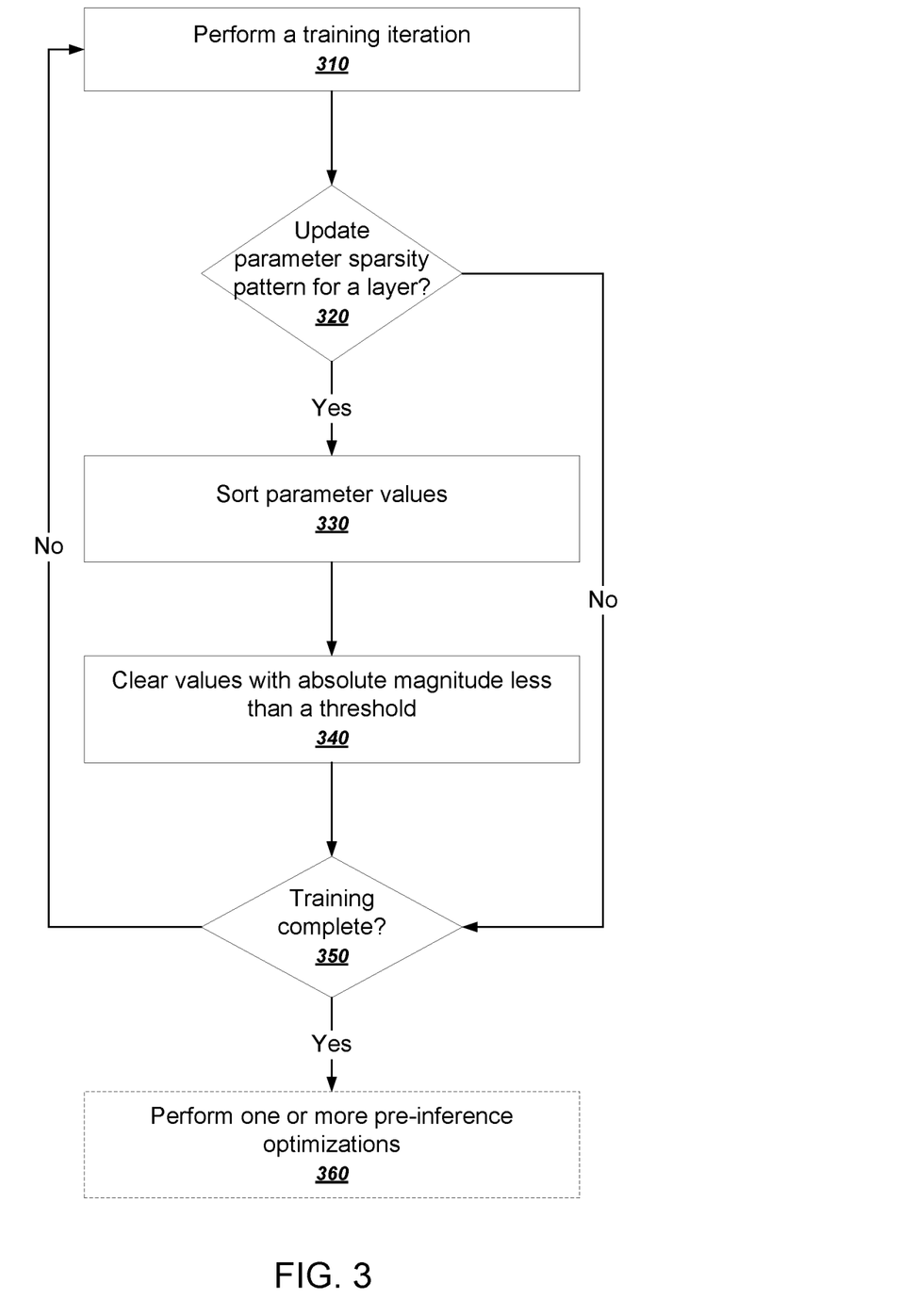
FIG. 3 is a flowchart of an example process for training a neural network to have a parameter matrix with a contiguous sparsity pattern.

FIG. 3 is a flowchart of an example process for training a neural network to have a parameter matrix with a contiguous sparsity pattern. The example process can be performed by any appropriate computing system that that can implement the operations and training updates of a neural network system. Optionally, the process of FIG. 3 may be performed by a first computer system (e.g. a server) to produce a neural network model, and that neural network model may subsequently be transmitted to a second computer system (e.g. a mobile phone, or other client device) which has relatively lower computational power and memory capacity. For convenience, the example process will be described as being performed by a system of one or more computers programmed appropriately in accordance with this specification.

The system performs a training iteration (310). In general, each training iteration updates the weights of the parameter matrices of the neural network after performing one or more or inference passes through the neural network system. In some implementations, each training iteration performs a backpropagation process that updates the weights of the parameter matrices through the layers in a direction opposite to the direction of the inference pass.

The system determines whether to update the parameter sparsity pattern for a layer (320); in other words, to reset the parameter values such that the parameter matrix satisfies the constraint of contiguous sparsity. For example, the system may update the sparsity pattern after every training iteration, or regularly each time that a certain number of iterations occurs, or only once, after a predetermined number of iterations.

If the sparsity pattern is to be updated (320), the system may employ a partitioning of the parameter matrix into a plurality of n×m blocks, where n and m are different integers. The partitioning may be pre-defined (i.e. the positions of the blocks may be pre-defined), and may be the same each time the sparsity pattern is updated. The system sorts the partitioned blocks of parameters into an order according to the absolute magnitudes of the parameters in each block, e.g. according to the sum of absolute magnitude of the parameters in each block (branch to 330); it then clears all the values of those blocks for which the parameters satisfy a threshold criterion indicative of the parameters being small. For example, the threshold criterion may be that the sum of the absolute magnitudes of the parameters of the block is less than a threshold (340). Clearing a value can include assigning a special value that will be disregarded during inference, e.g., zero or another reserved value (for simplicity, the term "zero value" is used here to cover both possibilities).

The threshold may be selected such that the proportion of the blocks for which the values are cleared is equal to a certain frequency value (this determines how many weights of are retained at a non-zero value; in other words, the frequency value determines the sparsity of the resulting parameter matrix). The order of the blocks obtained in step 330 makes it easy to determine such a threshold. Note that in variations of the method of FIG. 3, the threshold may be predetermined, and in this case the ordering step (330) may be omitted.

Step 340 has the effect of distilling the neural network, i.e. dramatically reducing the amount of data which is required to store the neural network, and the computational power which is required to operate the neural network. This makes the neural network suitable for use by the second computer system.

The system can be configured to use hyperparameters K, k, and Z, where K specifies the iteration interval (i.e. the number of iterations which occur between the times that, in step 320, the system determines to update the parameter sparsity pattern), k specifies how many weights to retain on each update, and Z represents a maximum value for k. In some implementations, the value of k increases as training progresses according to:

$$k = Z\left(1 - \left(1 - \frac{t - t_0}{S}\right)^3\right),$$

where t is the current iteration number, to is the iteration on which the first update occurred, and S is the total number of desired update steps.

The system determines whether training is complete (350). If not, the system performs another training iteration (branch to 310).

If training is complete (350), the system optionally performs one or more pre-inference optimizations (360). The pre-inference optimizations are each designed to take advantage of the contiguous sparsity pattern in the newly trained parameter matrix. The pre-inference optimizations can include low-precision delta encoding, sparsity pattern unrolling, and precise load balancing.

First, the system can encode the parameter matrix using low-precision delta encoding. The contiguous sparsity allows for additional data compression of the parameter matrix using delta encoding that provides advantages over using regular compressed sparse row (CSR) format. In particular, the system can delta encode the deltas between blocks using data types having lower precision than data types that encode the parameters. For example, instead of encoding the deltas using 16-bit integers, the system can instead use 8-bit integers. This reduces the storage space required to store a vast amount of metadata about the parameter matrix, which makes the storage requirements of the entire model smaller.

In addition, the contiguous pattern of parameter values allows the system to unroll the sparsity pattern into the source code of the neural network kernel itself. In other words, the system can automatically generate source code of the neural network kernel that encodes the sparsity pattern within the code. This allows the system to skip vast numbers of memory accesses that would otherwise be required to fetch, from memory, data that specifies the location of the next non-zero parameter value. Instead, the system can simply generate source code statements that directly encode the location of the next non-zero value. This also speeds up the inference time by reducing branches and memory stalls.

The contiguous pattern of parameter values also means that the entire sparsity pattern can be encoded with fewer source code statements than a random sparsity pattern. This means that the entire neural network kernel can often fit completely within a faster portion of the memory hierarchy, e.g., the L1 cache rather than main memory. In some implementations, the entire kernel is small enough to fit in the L1 cache while the encoded parameter matrix is small enough to fit within the data cache.

Consider the following example 8×8 matrix having a contiguous sparsity pattern which exhibits row sparsity:

$$P = \begin{bmatrix} 0 & 0 & 0 & a & b & c & d & e \\ 0 & d & e & f & 0 & 0 & 0 & 0 \\ 0 & 0 & 0 & 0 & 0 & 0 & g & h \\ 0 & i & j & k & l & m & n & o \\ 0 & 0 & 0 & 0 & 0 & 0 & 0 & 0 \\ q & r & s & t & 0 & 0 & 0 & 0 \\ 0 & u & v & w & 0 & 0 & 0 & 0 \\ 0 & 0 & 0 & 0 & 0 & x & y & z \end{bmatrix}$$

A compiler could unroll the program code that loops over reading these parameter values as shown by the pseudocode in the second column of TABLE 1. In other words, instead of the source code having a for loop structure, the source code instead has a series of sequential Read instructions that read different parameter values from the matrix. For clarity, other operations of the neural network kernel, including multiply-accumulates and other operations, have been omitted.

TABLE 1

| Line | Unrolling without encoding | Unrolling with encoding |
|---|---|---|
| 0 | Read(A1, 1) | Read(A4, 5) |
| 1 | Read(A2, 1) | Read(B2, 3) |
| 2 | Read(A3, 1) | Read(C7, 2) |
| 3 | Read(A4, 1) | Read(D2, 7) |
| 4 | Read(A5, 1) | Read(F1, 4) |
| 5 | Read(A6, 1) | Read(G2, 3) |
| 6 | Read(A7, 1) | Read(H6, 3) |
| 7 | Read(A8, 1) | |
| 8 | Read(B1, 1) | |
| 9 | Read(B2, 1) | |
| 10 | Read(B3, 1) | |
| 11 | Read(B4, 1) | |
| . | . | |
| . | . | |
| . | . | |
| 61 | Read(H6, 1) | |
| 62 | Read(H7, 1) | |
| 63 | Read(H8, 1) | |

As can be seen from this example, unrolling alone generates 64. Read instructions to read all values of the parameter matrix.

The last column in TABLE 1 illustrates unrolling with encoding. In particular, because the locations of the contiguous non-zero values of the parameter matrix are known at compile time, the system can generate Read instructions that directly encode the locations of the contiguous non-zero values.

In this example, the pseudocode instruction Read takes a first argument that specifies the position of a start of a block of non-zero parameter values, and a second argument that specifies how many contiguous values to read. These are known ahead of time from the sorting and clearing procedure described above. Therefore, the system can read all the non-zero values from the example parameter matrix with only 7 Read instructions instead of 64.

This optimization also makes the size of the code smaller, which further makes the storage requirements of the model smaller.

Lastly, the contiguous sparsity patterns allow the system to perform very precise load balancing on multi-compute element devices. Load balancing the operations of a sparse matrix-vector multiply having an unknown sparsity pattern among multiple processing units is challenging.

But during inference, models are fixed for long periods of time, and this allows the system to pre-compute the optimal load balancing among N processors ahead of time. For example, a system can assign a substantially equal number of contiguous blocks or block parameter values (i.e. parameter values which are within one of the blocks) to each processing core of a CPU, a GPU, or another parallel processing device, which makes the inference faster to compute than load balancing for a random sparsity pattern. As another example, a system can assign a substantially equal number of blocks to each processing element of an application-specific processor having multiple processing elements.

Figure 4:
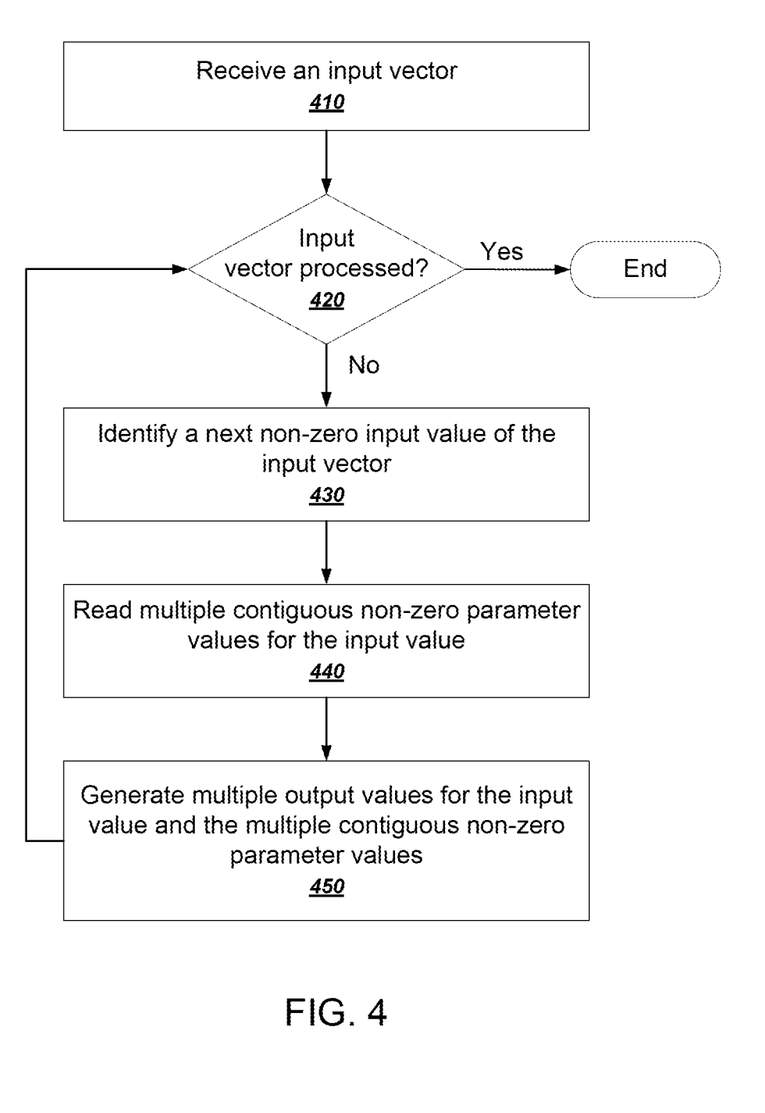
FIG. 4 is a flowchart of an example process for performing an inference pass over a neural network having a parameter matrix with a contiguous sparsity pattern.

FIG. 4 is a flowchart of an example process for performing an inference pass over a neural network having a parameter matrix with a contiguous sparsity pattern. The example process can be performed by a computing system that is configured to implement the operations of one layer of a neural network system. For example, the layer N computing system 220 of FIG. 2 can perform the example process. For convenience, the example process will be described as being performed by a system of one or more computers programmed appropriately in accordance with this specification.

The system receives an input vector (410). As described above, the input vector can be the output generated by a previous layer of the neural network system, or the input vector can be an initial representation of an initial input to the neural network system.

The system determines whether all of the input vector has been processed (420).

If not, the system identifies a next non-zero input value of the input vector (branch to 430). In other words, the system identifies the next non-zero input value of the input vector that has not yet been processed. For devices having multiple processors, this may skip over input values being processed by other processing components.

The system reads multiple contiguous non-zero parameter values for the input value (440). The system can identify a row of the parameter matrix corresponding to the input value and read the contiguous parameter values from that row. If the system used unrolling with location encoding described above, the system can immediately read the non-zero values from the parameter matrix in constant time without searching.

The system generates multiple output values for the input value and the multiple contiguous non-zero parameter values (450). For example, the system can multiply the input value by each of the multiple contiguous non-zero parameter values. The system can then optionally generate a partial sum to be added with the results for other input values.

If all the input values have been processed (420), the process ends (branch to end).

Performing inference passes using contiguous sparsity patterns thus speeds up the matrix-vector multiplications involved in an inference pass.

Note that the aforementioned techniques can confer advantages in parameter matrices having row sparsity or columnar sparsity. When the parameters have contiguous columnar sparsity, the same input vector values can be read once from memory and used for multiplying with multiple parameter values. This may be done before reading any further input vector values from the memory. When the parameters have contiguous row sparsity, the input vector values can be read with fewer memory operations. For example, a 1×n block size means that one memory operation can be used to load all the one or more values needed for the block from the input vector, while an n×1 block size means that while multiple memory operations are required to load the values from the input vector, the values can be reused n times. Blocks of size 1×n have the advantageous property that all memory loads of the input activations will be contiguous, while blocks of size n×1 mean that multiple rows can share the same input activations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

In addition to the embodiments described above, the following embodiments are also innovative:

Embodiment 1 is a method comprising:
receiving one or more parameter matrices of a neural network, wherein at least a first parameter matrix has parameter values stored in a contiguous sparsity pattern, the contiguous sparsity pattern being a two-dimensional pattern composed of zero values and a plurality of non-square rectangular blocks of non-zero values, the number of zero values being greater than the number of zero-values;
storing the first parameter matrix in storage associated with a computing device;
receiving an input vector of activation values; and
performing, by the computing device, an inference pass of the neural network to generate an output vector, including performing operations comprising:
reading, from the storage associated with the computing device, one or more activation values from the input vector,
reading, from the storage associated with the computing device, a block of non-zero parameter values, and
multiplying each of the one or more activation values by one or more of the block of non-zero parameter values.

Embodiment 2 is the according to embodiment 1, wherein the interference inference pass includes the operations of:

reading, from the storage associated with the computing device, a first activation value from the input vector, reading, from the storage associated with the computing device, multiple contiguous non-zero parameter values, and generating multiple output values of the output vector by a process comprising multiplying the first activation value by the multiple contiguous non-zero parameter values before reading another activation value from the input vector.

Embodiment 3 is the method according to embodiment 1, wherein the interference inference pass includes the operations of:

reading, from the storage associated with the computing device, multiple activation values from the input vector, reading, from the storage associated with the computing device, a block of multiple non-zero parameter values, and generating an output value of the output vector by a process comprising multiplying each of the multiple non-zero activation values by a corresponding one or more of the block of multiple non-zero parameter values before reading another parameter value.

Embodiment 4 is method of any preceding embodiment, further comprising:

receiving a value representing a number of processors of the computing device;

computing a number of blocks of non-zero values of the first parameter matrix; and assigning a substantially equal number of blocks or block parameter values to each processor of the computing device.

Embodiment 5 is the method of embodiment 4, wherein the processors of the computing device are processing cores of a central processing unit (CPU).

Embodiment 6 is the method of embodiment 4, wherein the processors of the computing device are processing elements of an application-specific processor.

Embodiment 7 is the method of any one of embodiments 1-6, further comprising:

generating a plurality of source code statements that encode locations of next non-zero values in the first parameter matrix, wherein performing, by the computing device, the inference pass comprises executing the generated plurality of source code statements.

Embodiment 8 is the method of embodiment 7, wherein the source code statements omit one or more memory access instructions that read the locations of the next non-zero values in the first parameter matrix.

Embodiment 9 is the method of any one of embodiments 1-8, further comprising:

training the neural network including performing operations comprising:

assigning zero to one or more blocks of parameter values.

following a determination that the magnitudes of the parameter values of the one or more blocks satisfy a threshold criterion.

Embodiment 10 is the method according to embodiment 9 comprising a step, prior to the assigning step, of sorting blocks of the parameter values according to a function of the parameter values of each block.

Embodiment 11 is the method of any one of embodiments 1-10, wherein each of the blocks has size n×m, where n and m are different integers, the step of reading activation values comprising reading m activation values, and the step of multiplying the activation values comprising multiplying each of the m activation values by a corresponding n of the block of parameter values.

Embodiment 12 is the method of embodiment 11, wherein n is at least four times larger than m or vice versa.

Embodiment 13 is the method of embodiment 11 or embodiment 12, wherein n is 1 or m is 1.

Embodiment 14 is the method of any one of embodiments 1-13, further comprising: encoding deltas between non-zero parameter values with a first data type having lower precision than a second data type that encodes at least some of the non-zero parameter values.

Embodiment 15 is the method of any one of embodiments 1-14, wherein the neural network generates a raw audio waveform in real-time.

Embodiment 16 is the method of any one of embodiments 1-15, wherein the computing device is a hand-held computing device.

Embodiment 17 is the method of any one of embodiments 1-16, wherein the computing device is installed on an autonomous or semi-autonomous vehicle.

Embodiment 18 is a system comprising: one or more computers and one or more storage devices storing instructions that are operable, when executed by the one or more computers, to cause the one or more computers to perform the method of any one of embodiments 1 to 15.

Embodiment 19 is a computer storage medium encoded with a computer program, the program comprising instructions that are operable, when executed by data processing apparatus, to cause the data processing apparatus to perform the method of any one of embodiments 1 to 15.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

In a further example, although FIG. 2 describes a feed-forward neural network in which, in each inference pass, each neuron generates an output which is a function only of its inputs and of the corresponding network parameters, in a variation one or more of the neural layers may be a recurrent neural layer, in which the output of the neural layer depends upon a state of the neural layer in a preceding inference pass. In one example, the layer N input 205 may comprise the layer N output 235 at one of more preceding times, e.g. the layer N output 235 during the preceding inference pass. In the case of a layer N computing system 220 which constitutes the first hidden layer, this may be in addition to data input to the neural network. In the case of a layer N computer system 220 which is a later hidden layer of the neural network, this may be in addition to the output of the preceding hidden layer.

What is claimed is:

1. A method comprising:
   receiving one or more parameter matrices of a neural network, wherein at least a first parameter matrix has parameter values stored in a contiguous sparsity pattern, the contiguous sparsity pattern being a two-dimensional pattern composed of zero values and a plurality of non-square rectangular blocks of non-zero values, the number of zero values being greater than the number of non-zero values, wherein the neural network has been trained in a training process that comprises partitioning the first parameter matrix into a plurality of non-square blocks and assigning zero or another reserved value to one or more of the non-square blocks of parameter values following a determination that magnitudes of the parameter values of the one or more blocks satisfy a threshold criterion;
   storing the first parameter matrix in storage associated with a computing device;
   receiving an input vector of activation values; and
   performing, by the computing device, an inference pass of the neural network to generate an output vector, including performing operations comprising:
   reading, from the storage associated with the computing device, one or more activation values from the input vector,
   reading, from the storage associated with the computing device, a block of non-zero parameter values, and
   multiplying each of the one or more activation values by one or more of the block of non-zero parameter values.

2. The method according to claim 1, wherein the inference pass includes the operations of:
   reading, from the storage associated with the computing device, a first activation value from the input vector,
   reading, from the storage associated with the computing device, multiple contiguous non-zero parameter values, and
   generating multiple output values of the output vector by a process comprising multiplying the first activation value by the multiple contiguous non-zero parameter values before reading another activation value from the input vector.

3. The method according to claim 1, wherein the inference pass includes the operations of:
   reading, from the storage associated with the computing device, multiple activation values from the input vector,
   reading, from the storage associated with the computing device, a block of multiple non-zero parameter values, and
   generating an output value of the output vector by a process comprising multiplying each of the multiple non-zero activation values by a corresponding one or more of the block of multiple non-zero parameter values before reading another parameter value.

4. The method of claim 1, further comprising:
   receiving a value representing a number of processors of the computing device;
   computing a number of blocks of non-zero values of the first parameter matrix; and
   assigning a substantially equal number of blocks or block parameter values to each processor of the computing device.

5. The method of claim 4, wherein the processors of the computing device are processing cores of a central processing unit (CPU).

6. The method of claim 4, wherein the processors of the computing device are processing elements of an application-specific processor.

7. The method of claim 1, further comprising:
   generating a plurality of source code statements that encode locations of next non-zero values in the first parameter matrix,
   wherein performing, by the computing device, the inference pass comprises executing the generated plurality of source code statements.

8. The method of claim 7, wherein the source code statements omit one or more memory access instructions that read the locations of the next non-zero values in the first parameter matrix.

9. The method according to claim 1, wherein the training process further comprises, prior to the assigning step, sorting blocks of the parameter values according to a function of the parameter values of each block.

10. The method of claim 1, wherein each of the blocks has size nxm, where n and m are different integers, the step of reading activation values comprising reading m activation values, and the step of multiplying the activation values comprising multiplying each of the m activation values by a corresponding n of the block of parameter values.

11. The method of claim 10, wherein n is at least four times larger than m or vice versa.

12. The method of claim 10, wherein n is 1 or m is 1.

13. The method of claim 1, further comprising:
   encoding deltas between non-zero parameter values with a first data type having lower precision than a second data type that encodes at least some of the non-zero parameter values.

14. The method of claim 1, wherein the neural network generates a raw audio waveform in real-time.

15. The method of claim 1, wherein the computing device is a hand-held computing device.

16. The method of claim 1, wherein the computing device is installed on an autonomous or semi-autonomous vehicle.

17. A system comprising:
   one or more computers and one or more storage devices storing instructions that are operable, when executed by the one or more computers, to cause the one or more computers to perform operations comprising:
   receiving one or more parameter matrices of a neural network, wherein at least a first parameter matrix has parameter values stored in a contiguous sparsity pattern, the contiguous sparsity pattern being a two-dimensional pattern composed of zero values and a plurality of non-square rectangular blocks of non-zero values, the number of zero values being greater than the number of zero-values, wherein the neural network has been trained in a training process that produces the contiguous sparsity pattern of the parameter values of the first parameter matrix;

storing the first parameter matrix in storage associated with a computing device;

receiving an input vector of activation values; and performing, by the computing device, an inference pass of the neural network to generate an output vector, including performing operations comprising:

reading, from the storage associated with the computing device, one or more activation values from the input vector, reading, from the storage associated with the computing device, a block of non-zero parameter values, and multiplying each of the one or more activation values by one or more of the block of non-zero parameter values.

18. One or more non-transitory computer storage media encoded with computer program instructions that when executed by one or more computers cause the one or more computers to perform operations comprising:

receiving one or more parameter matrices of a neural network, wherein at least a first parameter matrix has parameter values stored in a contiguous sparsity pattern, the contiguous sparsity pattern being a two-dimensional pattern composed of zero values and a plurality of non-square rectangular blocks of non-zero values, the number of zero values being greater than the number of zero-values, wherein the neural network has been trained in a training process that comprises partitioning the first parameter matrix into a plurality of non-square blocks and assigning zero or another reserved value to one or more of the non-square blocks of parameter values following a determination that magnitudes of the parameter values of the one or more blocks satisfy a threshold criterion;

storing the first parameter matrix in storage associated with a computing device;

receiving an input vector of activation values; and performing, by the computing device, an inference pass of the neural network to generate an output vector, including performing operations comprising:

reading, from the storage associated with the computing device, one or more activation values from the input vector, reading, from the storage associated with the computing device, a block of non-zero parameter values, and multiplying each of the one or more activation values by one or more of the block of non-zero parameter values.

* * * * *